(12) United States Patent
Yoshida et al.

(10) Patent No.: US 8,154,165 B2
(45) Date of Patent: Apr. 10, 2012

(54) GENERAL PURPOSE ENGINE WITH AXIAL GAP TYPE MOTOR/GENERATOR

(75) Inventors: Kenichi Yoshida, Tokyo (JP); Toshiyuki Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 344 days.

(21) Appl. No.: 12/379,410

(22) Filed: Feb. 20, 2009

(65) Prior Publication Data

US 2009/0230694 A1 Sep. 17, 2009

(30) Foreign Application Priority Data

Mar. 11, 2008 (JP) ................ P2008-061867

(51) Int. Cl.
  *H02K 21/12* (2006.01)
  *H02K 1/22* (2006.01)
  *H02K 7/18* (2006.01)
(52) U.S. Cl. .............. 310/156.32; 310/268; 290/1 A; 290/1 R
(58) Field of Classification Search ............. 290/1 A, 290/1 R; 310/156.32, 268
  See application file for complete search history.

(56) References Cited

U.S. PATENT DOCUMENTS

| 5,075,616 A | 12/1991 | Mitsui |
| 5,823,165 A * | 10/1998 | Sato et al. ............... 123/399 |
| 2001/0029906 A1 | 10/2001 | Suzuki |
| 2004/0149241 A1 | 8/2004 | Shomura et al. |
| 2004/0261766 A1 | 12/2004 | Matsuda et al. |
| 2005/0076877 A1 * | 4/2005 | Sawamura et al. ....... 123/197.1 |
| 2005/0194855 A1 | 9/2005 | Hasebe et al. |
| 2006/0214425 A1 | 9/2006 | Yamamoto et al. |
| 2007/0273233 A1 * | 11/2007 | Poore et al. ............ 310/156.37 |
| 2008/0238266 A1 * | 10/2008 | Moriyama et al. ......... 310/67 R |
| 2009/0071784 A1 * | 3/2009 | Combs et al. ............... 192/3.21 |

FOREIGN PATENT DOCUMENTS

| JP | 58-154855 U | | 9/1983 |
| JP | 64-15440 A | | 1/1989 |
| JP | 2-97300 A | | 4/1990 |
| JP | 2000-333427 A | | 11/2000 |
| JP | 2001-295657 | | 10/2001 |
| JP | 2003134737 A | * | 5/2003 |
| JP | 2004-239156 A | | 8/2004 |
| JP | 2005-16438 A | | 1/2005 |
| JP | 2005-269778 A | | 9/2005 |
| JP | 2006-188980 A | | 7/2006 |

OTHER PUBLICATIONS

Machine Translation JP2003134737 (2003).*
Notice of Reason of Rejection dated Nov. 4, 2011 (with an English translation).

* cited by examiner

*Primary Examiner* — Quyen Leung
*Assistant Examiner* — Jose Gonzalez Quinones
(74) *Attorney, Agent, or Firm* — McGinn IP Law Group, PLLC (57) ABSTRACT

The present invention achieves an improvement in the power generation capacity of a general purpose engine provided for a power generation application while realizing reductions in the weight and size thereof. An optional external apparatus can be attached to one shaft part of a rotary shaft, and an axial gap type motor/generator constituted by power generating rotors (inner and outer rotors) and a stator is attached integrally to another shaft part of the rotary shaft.

20 Claims, 5 Drawing Sheets

GENERAL PURPOSE ENGINE WITH AXIAL GAP TYPE MOTOR/GENERATOR

CROSS-REFERENCE TO RELATED APPLICATIONS

The disclosure of Japanese Patent Application No. 2008-061867, filed on Mar. 1, 2008 including the specification, drawings and abstract is incorporated herein by reference in its entirety.

BACKGROUND OF THE INVENTION

1. Field of the Invention

The present invention relates to a general purpose engine integrated with an axial gap type motor/generator.

2. Description of the Related Art

In a typical usage application of a general purpose engine, a power generating body is externally attached to the engine as an external apparatus, and power is generated using a driving force of the engine. Japanese Unexamined Patent Application Publication 2001-295657 discloses a general purpose engine to which a radial gap type motor/generator (power generating body) is externally attached.

When a power generating body is externally attached to a general purpose engine, the power generating body that serves as an external apparatus must conventionally be attached to a rotary shaft of the general purpose engine, which projects sideward from the engine. However, the size and weight of a power generating body provided separately to the general purpose engine are extremely great, and therefore, when the power generating body is merely attached externally, increases in overall size and weight occur, leading to an increase in the difficulty of user handling.

SUMMARY OF THE INVENTION

It is therefore an object of the present invention to achieve reductions in the weight and size of a general purpose engine provided for a power generation application while improving the power generation capacity of the engine.

To solve the problems described above, a first invention provides a general purpose engine in which an axial gap type motor/generator is integrated with an engine main body. A rotary shaft that is rotated by a driving force of the engine main body includes a first shaft part disposed on one side portion of the engine main body, and a second shaft part disposed on another side portion of the engine main body. The axial gap type motor/generator is attached integrally to the second shaft part. The axial gap type motor/generator comprises first and second power generating rotors that rotate integrally with the rotary shaft, and a stator that is attached to the engine main body. The second power generating rotor is disposed on the outside of the first power generating rotor. The stator is disposed between the first and second power generating rotors at a remove from the first and second power generating rotors. Here, a plurality of magnets are preferably attached in circumferential direction series to respective opposing faces of the first power generating rotor and the second power generating rotor, the opposing faces respectively opposing the stator, and a plurality of coils are preferably attached and connected to the stator.

The first invention can further include a plurality of first fins provided in circumferential direction on the second power generating rotor. In this case, a first air vent is preferably also provided in the second power generating rotor on the inside of the first fins so as to penetrate the second power generating rotor in the axial direction of the rotary shaft. Further, a fin member that rotates integrally with the rotary shaft and is inserted into a hollow site of the stator, on which a plurality of second fins are arranged in circumferential direction series, is preferably provided. The fin member can be formed integrally with the first power generating rotor. Further, a second air vent can be provided in the first power generating rotor so as to penetrate the first power generating rotor in the axial direction of the rotary shaft.

Moreover, in the first invention, the first power generating rotor and the second power generating rotor preferably function as flywheels for stabilizing a rotary force of the rotary shaft using self-generated inertial force. Further, an ignition magnet for detecting a rotation angle of the rotary shaft can be attached to the first power generating rotor or the second power generating rotor. An attachment member that extends in a substantially linear form can also be provided, presupposing that an outer diameter of the stator is larger than an outer diameter of the first power generating rotor. In this case, one end of the attachment member is preferably attached to the engine main body, and another end of the attachment member is preferably attached to a part of the stator having a larger diameter than the first power generating rotor. Further, a recoil starter that is disposed on the outside of the second power generating rotor in the axial direction of the rotary shaft and forcibly rotates the rotary shaft upon start-up of the engine main body can be provided.

A second invention provides a general purpose engine in which an axial gap type motor/generator is integrated with an engine main body. A rotary shaft that is rotated by a driving force of the engine main body includes a first shaft part disposed on one side of the engine main body, and a second shaft part disposed on another side of the engine main body. The axial gap type motor/generator is attached integrally to the second shaft part. The axial gap type motor/generator comprises first and second flywheels that rotate integrally with the rotary shaft, and a stator attached to the engine main body. The second flywheel is disposed on the outside of the first flywheel in an axial direction of the rotary shaft. The first and second flywheels stabilize a rotary force of the rotary shaft using self-generated inertial force. The stator is disposed between the first and second flywheels at a remove from the first and second flywheels. A plurality of coils are connected and attached to the stator. Further, a plurality of magnets are attached in circumferential direction series to respective opposing faces of the first and second flywheels, the opposing faces respectively opposing the stator.

The second invention can further include a plurality of first fins provided in circumferential direction series on the second flywheel. In this case, a first air vent provided in the second flywheel on the inside of the first fins so as to penetrate the second flywheel in the axial direction of the rotary shaft is preferably provided. Further, a fin member that rotates integrally with the rotary shaft and is inserted into a hollow site of the stator, on which a plurality of second fins are arranged in circumferential direction series, can be provided, and the fin member can be formed integrally with the first flywheel. Further, a second air vent provided in the first flywheel so as to penetrate the first flywheel in the axial direction of the rotary shaft can be provided.

Moreover, in the second invention, an ignition magnet for detecting a rotation angle of the rotary shaft is preferably attached to the first flywheel or the second flywheel. An attachment member that extends in a substantially linear form can also be provided, presupposing that an outer diameter of the stator is larger than an outer diameter of the first flywheel. In this case, one end of the attachment member is preferably attached to the engine main body and another end of the attachment member is preferably attached to a part of the stator having a larger diameter than the first flywheel. Further, a recoil starter that is disposed on the outside of the second flywheel in the axial direction of the rotary shaft and forcibly rotates the rotary shaft upon start-up of the engine main body can be provided.

According to the first invention, the axial gap type motor/generator serving as a power generating body is formed integrally with the engine main body. Hence, the general purpose engine can be provided for a power generation application without attaching a separate power generating body thereto as an external apparatus. Furthermore, the axial gap type motor/generator is used as the power generating body formed integrally with the engine main body, while the stator is provided as a counterpart member required by the first and second power generating rotors during power generation. Hence, an improvement in power generation capacity can be achieved while suppressing increases in the axial direction length of the rotary shaft. As a result, an improvement in the power generation capacity of the general purpose engine when provided for a power generation application can be achieved while realizing reductions in the size and weight thereof.

According to the second invention, the axial gap type motor/generator serving as a power generating body is formed integrally with the engine main body. Hence, the general purpose engine can be provided for a power generation application without attaching a separate power generating body thereto as an external apparatus. Furthermore, the axial gap type motor/generator is used as the power generating body formed integrally with the engine main body. Therefore, a function as a power generating rotor can be added to a flywheel provided in a pre-existing general purpose engine simply by adding a power generating magnet or the like, without greatly modifying the size and other specifications of the flywheel. Further, the stator is provided as the counterpart member required by the first and second flywheels during power generation. Hence, an improvement in power generation capacity can be achieved while suppressing increases in the axial direction length of the rotary shaft. As a result, a power generating engine using a pre-existing general purpose engine as a base can be realized at low cost without greatly modifying the pre-existing design and specifications thereof, and moreover, an improvement in power generation capacity can be achieved while realizing reductions in size and weight.

DESCRIPTION OF THE PREFERRED EMBODIMENTS

Figure 1:
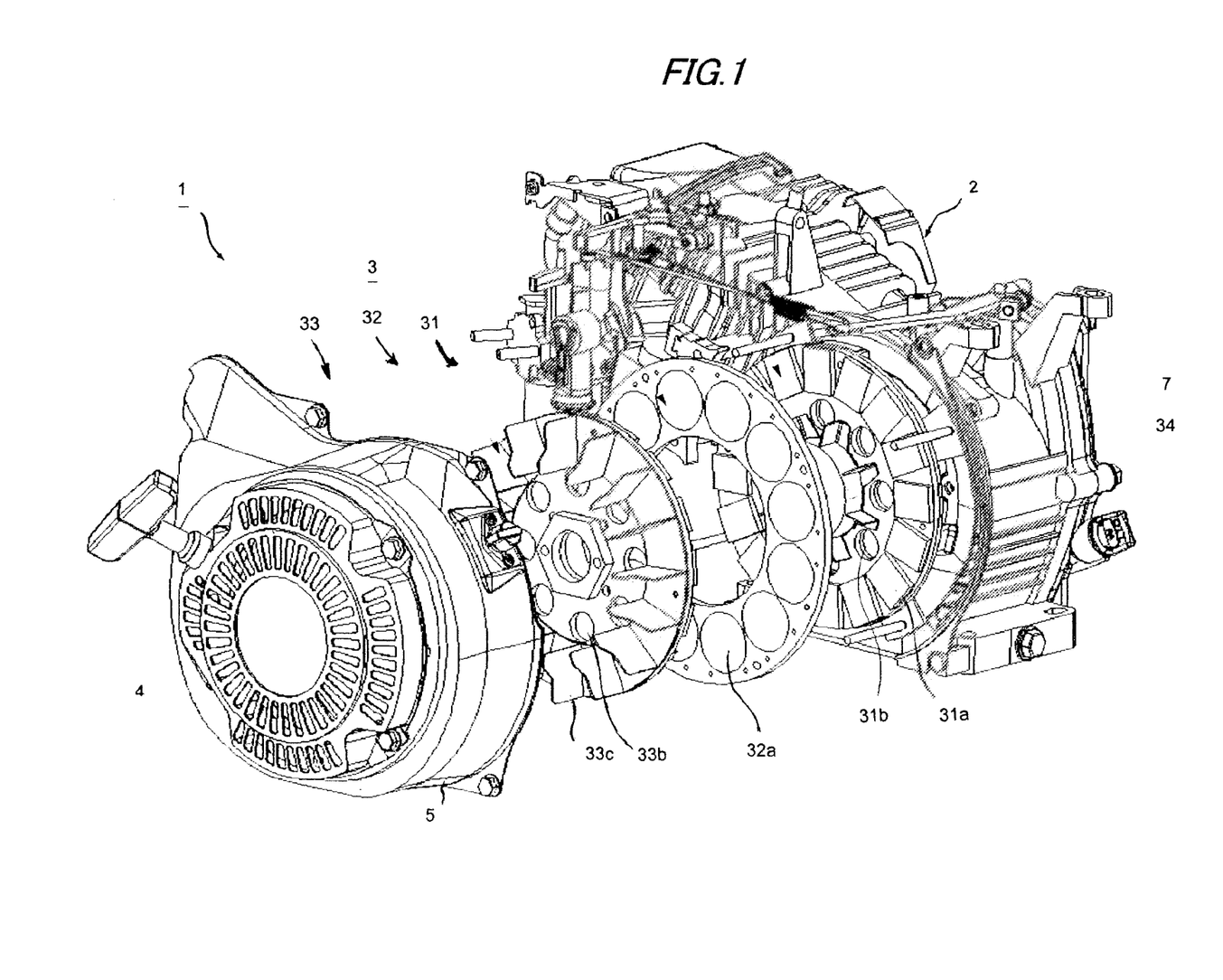
FIG. 1 is a development perspective view of a general purpose engine seen from one end side of a rotary shaft.
Figure 2:
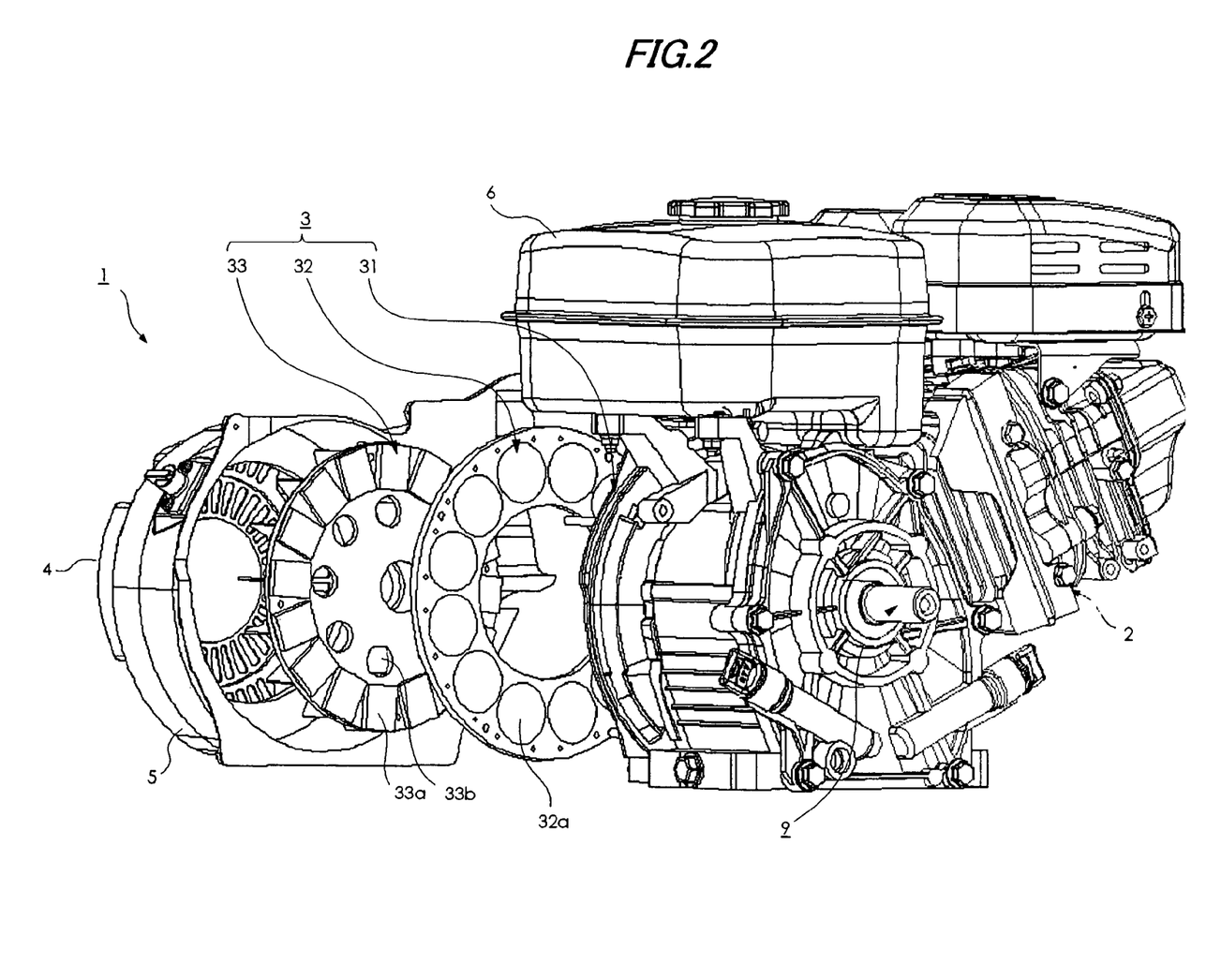
FIG. 2 is a development perspective view of the general purpose engine seen from another end side of the rotary shaft.
Figure 3:
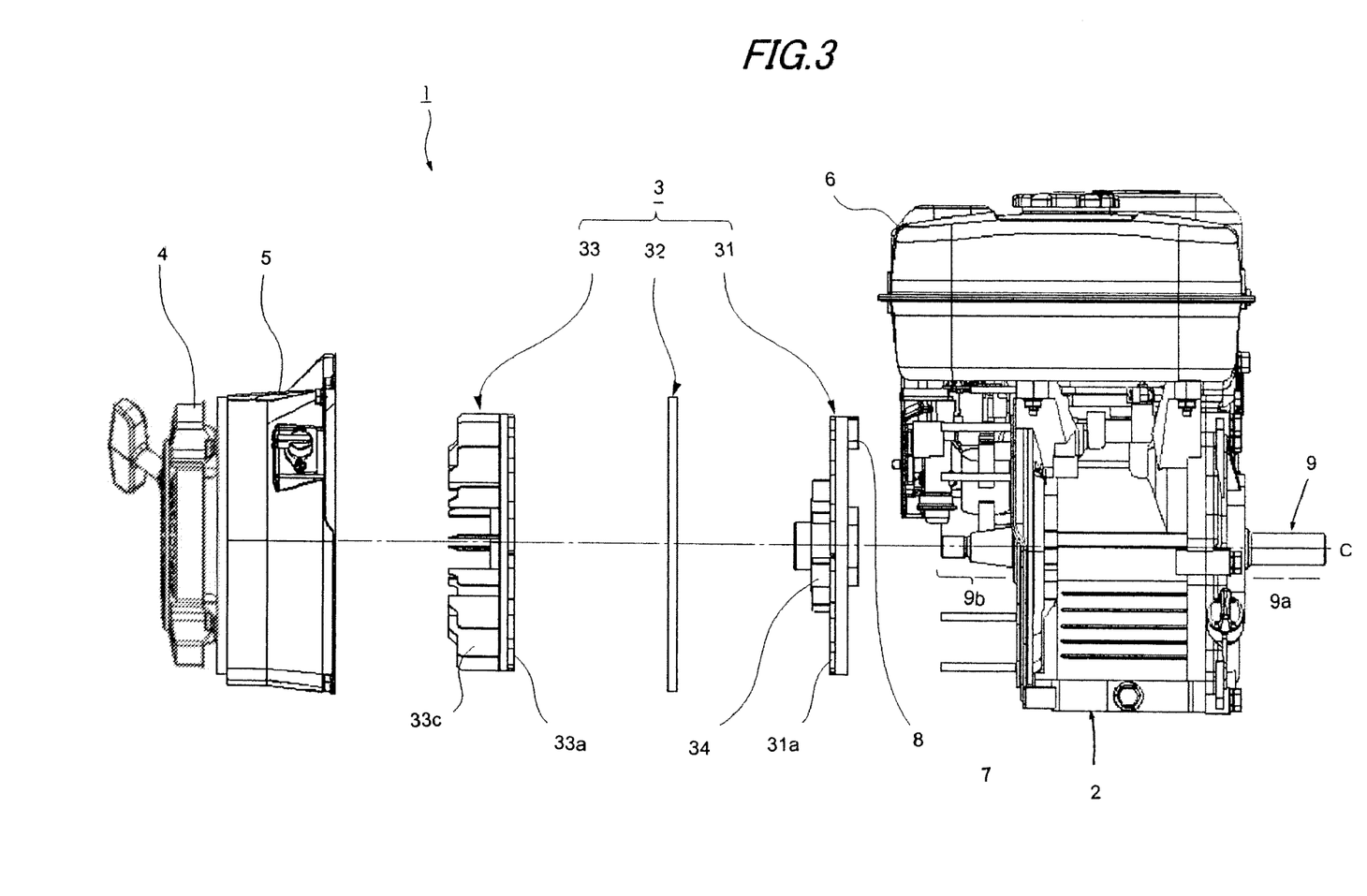
FIG. 3 is a development side view of the general purpose engine.

FIGS. 1 and 2 are development perspective views of a general purpose engine 1 according to this embodiment. FIG. 1 shows the general purpose engine 1 from one end side of a rotary shaft 9, and FIG. 2 shows the general purpose engine 1 from another end side of the rotary shaft 9. FIG. 3 is a development side view of the general purpose engine 1, and a reference symbol C in FIG. 3 denotes an axial direction of the rotary shaft 9. The general purpose engine 1 is formed by integrating an axial gap type motor/generator 3 with an engine main body 2, and is provided for a power generation application. The general purpose engine 1 is constituted mainly by the engine main body 2, the axial gap type motor/generator 3, a recoil starter 4, a housing 5, and a fuel tank 6. Note that in FIG. 1, the fuel tank 6, which is installed above the engine main body 2, has been omitted to show the outer shape of the engine main body 2 more clearly.

The engine main body 2 has a similar constitution to a typical general purpose engine. The fuel tank 6 for storing fuel is attached to an upper portion of the engine main body 2. The rotary shaft 9 is rotated by the driving force of the engine main body 2. The rotary shaft 9 includes shaft parts 9a, 9b shown in FIG. 3, which project respectively from left and right side portions of the engine main body 2. An arbitrary external apparatus (not shown) provided separately as an option can be attached to the shaft part 9a that projects from one side portion of the engine main body 2. Meanwhile, the axial gap type motor/generator 3 is attached integrally to the shaft part 9b that projects from the other side portion on the opposite side to the shaft part 9a.

The axial gap type motor/generator 3 is constituted mainly by disc-shaped power generating rotors 31, 33, and a stator 32. In this specification, of the left and right side faces of the power generating rotors 31, 33, the side opposing the stator 32 will be referred to as an "opposing face", and the side that does not oppose the stator 32 will be referred to as a "non-opposing face". The respective centers of the power generating rotors 31, 33 are fixed to the rotary shaft 9 such that the power generating rotors 31, 33 rotate integrally with the rotary shaft 9. A plurality of power generating magnets 31a, for example neodymium-based permanent magnets, are attached in circumferential direction series to the opposing face of the inside power generating rotor 31 (to be referred to hereafter as the "inner rotor 31") closer to the engine main body 2, and the polarities of adjacent power generating magnets 31a are alternately reversed. Further, a plurality of power generating magnets 33a formed from the same material as the power generating magnets 31a are attached in circumferential direction series to the opposing face of the power generating rotor 33 (to be referred to hereafter as the "outer rotor 33") on the outside of the inner rotor 31 in the axial direction C. Similarly to the power generating magnets 31a, the polarities of adjacent power generating magnets 33a are alternately reversed. Meanwhile, the stator 32 takes a ring shape with a hollow site formed in the center. The stator 32 is fixed to the engine main body 2 via a plurality of attachment members 7 extending in a substantially linear form. Further, the stator 32 is disposed between the inner and outer rotors 31, 33 at a remove from both the inner and outer rotors 31, 33 in the axial direction C of the rotary shaft 9. A plurality of coils 32a, for example concentrated windings, are connected and attached to the stator 32.

The outer rotor 33 is provided with a plurality of cooling fins 33c and a plurality of air vents 33b. The cooling fins 33c, which are arranged in the circumferential direction, respectively stand upright from the non-opposing face of the outer rotor 33 in the axial direction C and extend in a substantially diametrical direction. Further, the air vents 33b, which are arranged in the circumferential direction, are provided on the inside of the cooling fins 33c and penetrate the outer rotor 33 in the axial direction C.

Meanwhile, the inner rotor 31 is provided with a fin member 34 and a plurality of air vents 31b. The fin member 34 is provided on the opposing face of the inner rotor 31, includes a plurality of cooling fins arranged around the outer periphery of the fin member 34 so as to extend in the diametrical direction, and rotates integrally with the rotary shaft 9. Note that as long as the fin member 34 rotates integrally with the rotary shaft 9, it need not necessarily be formed integrally with the inner rotor 31, and can be formed integrally with the outer rotor 33 or formed as a separate member to the inner and outer rotors 31, 33. The fin member 34 is inserted into and housed in the hollow site of the stator 32. Further, the air vents 31b, which are arranged in the circumferential direction, penetrate the inner rotor 33 in the axial direction C. The fin member 34 and the air vents 31b function together with the air vents 33b and the cooling fins 33c on the outer rotor 33 side to cool both the engine main body 2 and the axial gap type motor/generator 3.

In this embodiment, the inner and outer rotors 31, 33 are integrated before being attached to the rotary shaft 9 to facilitate the operation to attach the inner and outer rotors 31, 33 to the rotary shaft 9 and secure a gap between the inner and outer rotors 31, 33 with a high degree of precision. More specifically, a cylindrical boss portion projecting in the axial direction C is formed in the center of a front surface of the inner rotor 31 on the opposite side to the outer rotor 33. An inner diameter of the boss portion corresponds to the outer diameter of the rotary shaft 9. An apex portion of the boss portion is caused to contact the opposing face of the outer rotor 31, and in this state, a bolt is inserted therein from the non-opposing face of the outer rotor 33 to fasten the two rotors 31, 33 together. Note that the boss portion can be formed on the outer rotor 33 rather than the inner rotor 31. Furthermore, the inner and outer rotors 31, 33 can be formed integrally as a single member instead of fastening the separately formed inner and outer rotors 31, 33 together mechanically.

The outer diameter of the inner rotor 31 is smaller than the outer diameter of the stator 32 positioned on the outside thereof. The reason for this is to optimize the shape of an attachment member 7 used to attach the stator 32 to the engine main body 2 and suppress displacement (vibration amplitude) of the stator 32 caused by vibration of the engine main body 2. In this case, the site of the stator 32 having a larger diameter than the inner rotor 31 that projects in the diametrical direction (radial direction) is used as a site for fixing one end of the arm-shaped attachment member 7. Further, since the inner rotor 31 has a smaller diameter than the stator 32, interference between the attachment member 7 and the inner rotor 31 can be avoided even when the attachment member 7 takes a substantially linear shape having a minimum extension length.

The axial gap type motor/generator 3 has two power generation systems. A first system is constituted by a pair including the inner rotor 31 and the stator 32. An axial gap of the first system exists between the opposing face of the inner rotor 31 and the face of the stator 32 opposing the opposing face of the inner rotor 31. A second system is constituted by a pair including the outer rotor 33 and the stator 32. An axial gap of the second system exists between the opposing face of the outer rotor 33 and the face of the stator 32 opposing the opposing face of the outer rotor 33. The stator 32 disposed between the inner and outer rotors 31, 33 is provided as a counterpart member required by the respective rotors 31, 33 during power generation. Note that when the axial gap type motor/generator 3, which does not use a magnetic steel sheet, is employed, iron loss is reduced in comparison with a typical radial gap type motor/generator, and as a result, highly efficient power generation can be realized.

The two rotors 31, 33 fixed to the shaft part 9b of the rotary shaft 9 carry a certain degree of weight due not only to their own weight, but also the weight of the power generating magnets 31a, 33a embedded therein. Accordingly, the inner rotor 31 and outer rotor 33 function respectively as flywheels for stabilizing the rotary force of the rotary shaft 9, which varies over a single cycle of the engine main body 2, by means of inertial force generated when they rotate.

The recoil starter 4 is provided on the non-opposing face side of the outer rotor 33, or in other words on the outside of the outer rotor 33, to rotate the rotary shaft 9 forcibly during start-up of the engine main body 2. An intake port for taking in air to cool the engine main body 2 and the axial gap type motor/generator 3 is formed in the recoil starter 4. The axial gap type motor/generator 3 constituted as described above is substantially entirely covered by the housing 5. The housing 5 is shaped internally such that the air taken in through the intake port of the recoil starter 4 is led to the engine main body 2 side.

An ignition magnet 8 (see FIG. 3) for detecting a rotation angle of the rotary shaft 9 is attached to one of the inner rotor 31 and the outer rotor 33. In this embodiment, the ignition magnet 8 is attached to the non-opposing face side (the side opposing the engine main body 2) of the inner rotor 31, and the position of the ignition magnet 8, or in other words the rotation angle of the rotary shaft 9, is detected by a position detection sensor, not shown in the drawing. The position detection sensor is attached to the engine main body 2 so as to be positioned further toward the outside than an outer edge of the inner rotor 31, and detects the point at which it opposes the ignition magnet 8 in the diametrical direction of the inner rotor 31.

Note that the ignition magnet 8 can be attached to the outer rotor 33 rather than the inner rotor 31. For example, the ignition magnet 8 can be attached to the non-opposing face side (the side on which the cooling fins 33c are formed) of the outer rotor 33. In this case, the position detection sensor must be attached further toward the outside than the outer edge of the stator 32 to avoid interference with the stator 32, and therefore the gap between the position detection sensor and the ignition magnet 8 increases. However, sufficient detection precision for practical purposes can be secured. Note that when the ignition magnet 8 is attached to the outer rotor 33, ignition system members (not shown) such as an ignition coil are provided in the vicinity of the ignition magnet 8. By providing the ignition system members further toward the outside, clearance adjustment can be performed easily during maintenance.

When the rotary shaft 9 is rotated by driving the engine main body 2, the inner and outer rotors 31, 33 formed integrally with the rotary shaft 9 also rotate. When the inner and outer rotors 31, 33 rotate, the power generating magnets 31a, 33a attached to the rotors 31, 33 rotate about the axis of the rotary shaft 9, and as a result, a magnetic field surrounding each of the rotors 31, 33 varies rapidly. Accordingly, an induced electrical current generated by electromagnetic induction in the power generating magnets 31a, 33a flows into the coils 32a of the stator 32 disposed in the vicinity of the rotors 31, 33. By means of this power generating mechanism, the axial gap type motor/generator 3 generates and outputs electric power.

Figure 4:
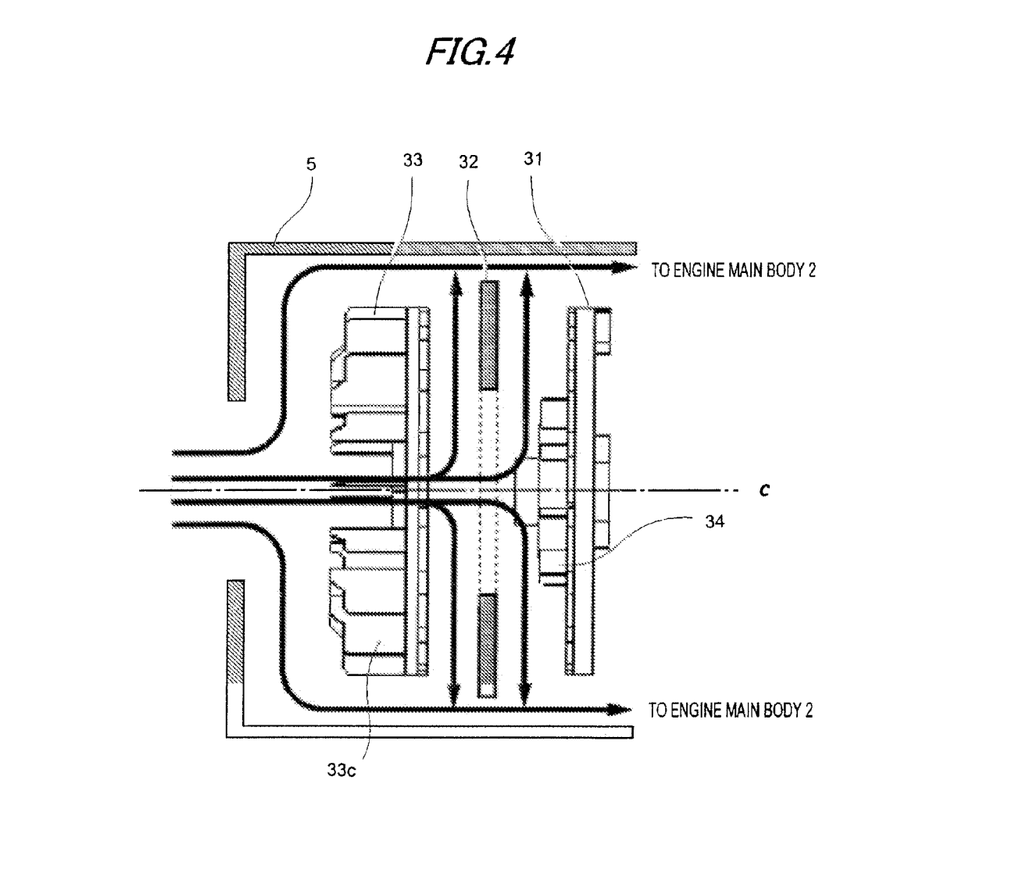
FIG. 4 is an illustrative view of a cooling mechanism employing an air flow and provided in a housing.

FIG. 4 is an illustrative view of a cooling mechanism employing an air flow and provided in the housing 5. In the drawing, the members 31 to 33 are shown at a considerable remove from each other in the axial direction C, but this is merely to facilitate description, and in actuality, the members 31 to 33 are disposed in closer proximity such that the fin member 34 of the inner rotor 31 is inserted into the hollow site of the stator 32. When the rotary shaft 9 is rotated by driving the engine main body 2, the cooling fins 33c provided on the outer rotor 33 displace in a circumferential direction. As a result, a part of the air (outside air flow) that is taken in through the intake port of the recoil starter 4 is caused to flow out in the outer peripheral direction of the outer rotor 33 by the cooling fins 33c. The outside air flow that flows out to the outer periphery flows in the axial direction C while revolving around the interior shape of the housing 5 until it reaches the engine main body 2. This outside air flow cools an outer peripheral site of the outer rotor 33, an outer peripheral site of the stator 32, and an outer peripheral site of the inner rotor 31, and as a result, the engine main body 2 is also cooled.

Further, when the rotary shaft 9 rotates, the fin member 34 formed integrally with the inner rotor 31 also rotates. As a result, a part of the air (inner air flow) that is taken in through the intake port of the recoil starter 4 passes through the air vents 33b in the outer rotor 33 and flows into the hollow site of the stator 32, or in other words the interior of the axial gap type motor/generator 3. When the fin member 34 rotates, a part of the inner air flow that flows into the interior of the axial gap type motor/generator 3 flows out in the outer peripheral direction of the stator 32 through a gap (axial gap) between the outer rotor 33 and the stator 32. Another part of the inner air flow flows out in the outer peripheral direction of the stator 32 through a gap between the stator 32 and the inner rotor 31. The inner air flow that flows out to the outer periphery then converges with the outer air flow. This inner air flow cools the respective interiors of the inner rotor 31, the stator 32, and the outer rotor 33. Another part of the inner air flow flows into the engine main body 2 through the air vents 31b in the inner rotor 31. By means of this air flow, both the axial gap type motor/generator 3 and the engine main body 2 are cooled. Note that the air flow direction in the interior of the stator 32 is defined unambiguously by the relationship between the rotation direction of the rotary shaft 9 and the tilt direction of the fin member 34. Having reached the engine main body 2, the air is discharged to a width direction rear side (axle direction inner side).

According to this embodiment, the axial gap type motor/generator 3 serving as a power generating body is integrated with the engine main body 2. Therefore, the general purpose engine 1 can be provided for a power generation application without attaching a separate power generating body thereto as an external apparatus. Moreover, when an external apparatus is attached, use of the external apparatus and power generation by the axial gap type motor/generator 3 can be performed in parallel. The axial gap type motor/generator 3 is used as an integrated power generating body, and the stator 32 is provided as a counterpart member required by the inner and outer rotors 31, 33 during power generation. Hence, increases in the axial direction length of the rotary shaft 9 can be suppressed. Furthermore, an electric field generated by the power generating magnet 31a of the inner rotor 31 and an electric field generated by the power generating magnet 33a of the outer rotor 33 coexist as electric fields applied to the coils 32a of the stator 32. In other words, a two-system electric field is applied to the coils 32a, and therefore, theoretically, an output that is approximately twice as high as that of a case in which the power generating magnets 31a, 33a are provided singly (in a single system) can be expected, leading to an improvement in power generation capacity. For these reasons, an improvement in the power generation capacity of the general purpose engine 1 when provided for a power generation application can be achieved while realizing reductions in the size and weight thereof.

Typically, the axial gap type motor/generator 3 is advantaged over a radial gap type motor/generator in that the radial direction (diametrical direction) size thereof can be reduced. Accordingly, flywheels provided in a pre-existing general purpose engine can be caused to function as the inner and outer rotors 31, 33 simply by attaching the power generating magnets 31a, 33a, without greatly modifying the size and other specifications of the flywheels or the specifications and so on of an engine main body of the general purpose engine. As a result, the general purpose engine 1 for a power generation application, which uses a pre-existing general purpose engine as a base, can be realized at low cost without greatly modifying the pre-existing design and specifications thereof, and more over, an improvement in power generation capacity can be achieved while realizing reductions in size and weight.

When a pre-existing general purpose engine including flywheels is used as a base, the plurality of power generating magnets 31a, 33a are attached in circumferential direction series to respectively opposing surfaces of inner and outer flywheels that are attached to the shaft part 9b so as to rotate integrally with the rotary shaft 9. The stator 32 is then disposed on the rotary shaft 9 between the inner and outer flywheels and at a remove from the respective flywheels. When this improvement is implemented on pre-existing flywheels, the flywheels can act as functional equivalents of the inner and outer rotors 31, 33.

Furthermore, according to this embodiment, the axial gap type motor/generator 3 and the engine main body 2 can be cooled effectively. More specifically, the outer air flow that flows out in the outer peripheral direction of the outer rotor 33 when the cooling fins 33c displace in the circumferential direction is led around the housing 5 to the engine main body 2 in the axial direction C. Further, the inner air flow that is taken in through the air vents 33b upon rotation of the fin member 34 passes through the gap from the hollow site of the stator 32 and then converges with the outer air flow. By means of the outer air flow and the inner air flow, the inner and outer rotors 31, 33, the stator 32, and the engine main body 2 are cooled.

Furthermore, according to this embodiment, the inner rotor 31 is disposed on the inside of the stator 32, and therefore an exposed site of the inner rotor 31 that is exposed to the exterior can be reduced. Hence, even during air flow generation by the outer rotor 33, foreign matter is unlikely to invade between the inner rotor 31 and the stator 32, and therefore the general purpose engine 1 can be realized with a high level of durability.

Moreover, according to this embodiment, the cooling fins 33c are formed on the outer rotor 33 disposed on the outside of the stator 32, and therefore a power generation function and a cooling function can be realized by a single member, enabling a reduction in the number of used wearable components. Furthermore, when the ignition magnet 8 is also attached to the outer rotor 33, an engine control function can be added to the outer rotor 33, enabling a further reduction in the number of components of the general purpose engine 1. Due to these effects, the axial gap type motor/generator 3 can be assembled easily, which contributes to an improvement in mass productivity.

Figure 5:
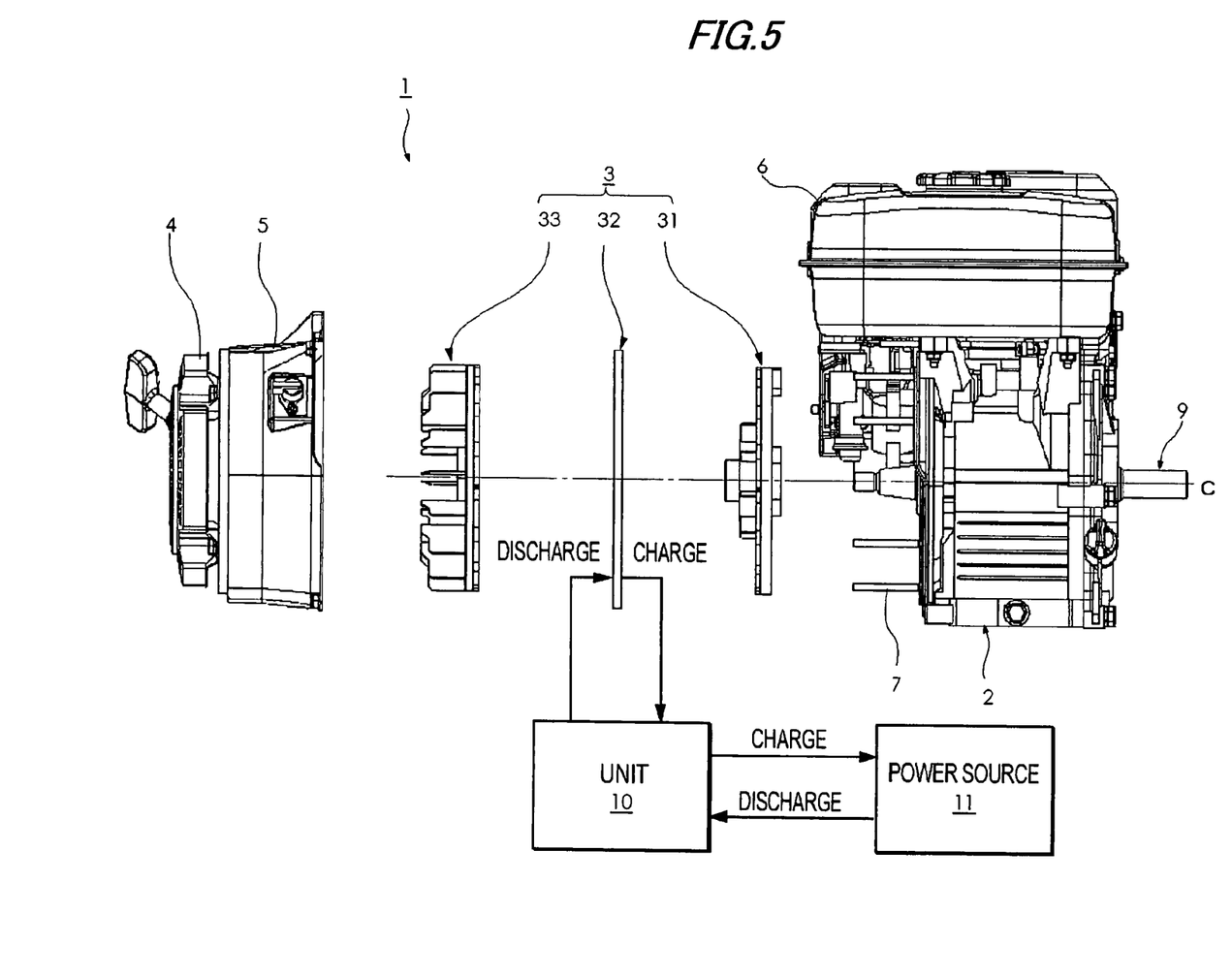
FIG. 5 is an illustrative view showing a charge/discharge system employing the general purpose engine.

Note that the embodiment described above focuses on power generation by the axial gap type motor/generator 3, or in other words charging, but both charging and discharge can be performed. FIG. 5 is an illustrative view showing a charge/discharge system employing the general purpose engine 1. During charging, the electric current that flows out of the stator 32 flows into a power source 11 via a unit 10. The unit 10 controls charge and discharge by the power source 11. The power source 11 is a storage apparatus capable of charge and discharge, such as a lead battery, a lithium ion battery, or a capacitor, for example. As a result, the kinetic energy of a rotary body is converted into electric energy with which the power source 11 is charged. During discharge, on the other hand, the current that flows out of the power source 11 flows into the stator 32 via the unit 10. As a result, electric energy is converted into the kinetic energy of the rotary body and the axial gap type motor/generator 3 begins to rotate. When charge/discharge is employed in this manner, the axial gap type motor/generator 3 can be caused to function not only as a power generating body, but also as a starter of the general purpose engine 1. Note that switching between charge and discharge is performed by operating a switch provided on the unit 10.

Furthermore, in the embodiment described above, the stator is interposed between the inner and outer rotors 31, 33, but another power generating rotor can be added. In this case, it is sufficient for n-1 stators to be prepared in relation to n power generation rotors.

What is claimed is:

1. A general purpose engine, comprising:
   an engine main body;
   a rotary shaft that is rotated by a driving force of said engine main body; and
   an axial gap type motor/generator attached integrally to the rotary shaft,
   wherein said axial gap type motor/generator comprises:
      a first power generating rotor that rotates integrally with said rotary shaft;
      a second power generating rotor that rotates integrally with said rotary shaft and is disposed on an outside of said first power generating rotor;
      a stator that is attached to said engine main body and is disposed between said first power generating rotor and said second power generating rotor at a predetermined distance from both said first power generating rotor and said second power generating rotor; and
      a fin member disposed on said first power generating rotor and being inserted into a hollow site of said stator.

2. The general purpose engine according to claim 1, wherein a plurality of magnets are attached in circumferential direction series to respective opposing faces of said first power generating rotor and said second power generating rotor, said opposing faces respectively opposing said stator, and
   wherein a plurality of coils are attached and connected to said stator.

3. The general purpose engine according to claim 1, further comprising a plurality of first fins provided in circumferential direction series on said second power generating rotor.

4. The general purpose engine according to claim 3, further comprising a first air vent provided in said second power generating rotor on an inside of said first fins so as to penetrate said second power generating rotor in an axial direction of said rotary shaft.

5. The general purpose engine according to claim 4, wherein the fin member rotates integrally with said rotary shaft and is inserted into the hollow site of said stator, on which a plurality of second fins are arranged in circumferential direction series.

6. The general purpose engine according to claim 5, wherein said fin member is formed integrally with said first power generating rotor.

7. The general purpose engine according to claim 6, further comprising a second air vent provided in said first power generating rotor so as to penetrate said first power generating rotor in said axial direction of said rotary shaft.

8. The general purpose engine according to claim 1, wherein said first power generating rotor and said second power generating rotor function as flywheels for stabilizing a rotary force of said rotary shaft.

9. The general purpose engine according to claim 1, wherein an ignition magnet for detecting a rotation angle of said rotary shaft is attached to said first power generating rotor or said second power generating rotor.

10. The general purpose engine according to claim 1, further comprising an attachment member that extends in a substantially linear form,
    wherein an outer diameter of said stator is larger than an outer diameter of said first power generating rotor, and
    wherein one end of said attachment member is attached to said engine main body and another end of said attachment member is attached to a site of said stator having a larger diameter than a diameter of said first power generating rotor.

11. The general purpose engine according to claim 1, further comprising a recoil starter that is disposed on an outside of said second power generating rotor and forcibly rotates said rotary shaft upon start-up of said engine main body.

12. A general purpose engine, comprising:
    an engine main body;
    a rotary shaft that is rotated by a driving force of said engine main body; and
    an axial gap type motor/generator attached integrally to said rotary shaft,
    wherein said axial gap type motor/generator comprises:
       a first flywheel that rotates integrally with said rotary shaft and stabilizes a rotary force of said rotary shaft;
       a second flywheel that rotates integrally with said rotary shaft, is disposed on an outside of said first flywheel, and stabilizes said rotary force of said rotary shaft;
       a stator that is attached to said engine main body and is disposed between said first flywheel and said second flywheel at a predetermined distance from both said first flywheel and said second flywheel, to which a plurality of coils are connected and attached; and
       a fin member disposed on said first flywheel and being inserted into a hollow site of said stator, and
    wherein a plurality of magnets are attached in circumferential direction series to respective opposing faces of said first flywheel and said second flywheel, said opposing faces respectively opposing said stator.

13. The general purpose engine according to claim 12, wherein said plurality of magnets are attached in circumferential direction series to said respective opposing faces of said first flywheel and said second flywheel, said opposing faces respectively opposing said stator, and
    wherein said plurality of coils are connected and attached to said stator.

14. The general purpose engine according to claim 12, further comprising a plurality of first fins provided in circumferential direction series on said second flywheel.

15. The general purpose engine according to claim 14, further comprising a first air vent provided in said second flywheel on an inside of said first fins so as to penetrate said second flywheel in an axial direction of said rotary shaft.

16. The general purpose engine according to claim 15, wherein said fin member rotates integrally with said rotary shaft and is inserted into the hollow site of said stator, on which a plurality of second fins are arranged in circumferential direction series.

17. The general purpose engine according to claim 16, wherein said fin member is formed integrally with said first flywheel.

18. The general purpose engine according to claim 17, further comprising a second air vent provided in said first flywheel so as to penetrate said first flywheel in said axial direction of said rotary shaft.

19. The general purpose engine according to claim 12, wherein an ignition magnet for detecting a rotation angle of said rotary shaft is attached to said first flywheel or said second flywheel.

20. The general purpose engine according to claim 12, further comprising an attachment member that extends in a substantially linear form,
wherein an outer diameter of said stator is larger than an outer diameter of said first flywheel, and
wherein one end of said attachment member is attached to said engine main body and another end of said attachment member is attached to a site of said stator having a larger diameter than said first flywheel.

\* \* \* \* \*